United States Patent
Neumann et al.

(10) Patent No.: US 12,521,051 B2
(45) Date of Patent: Jan. 13, 2026

(54) MULTIMODAL INVESTIGATION OF SPEECH, TEXT, COGNITIVE AND FACIAL VIDEO FEATURES FOR CHARACTERIZING DEPRESSION WITH AND WITHOUT MEDICATION

(71) Applicant: Modality.AI, Inc., San Francisco, CA (US)

(72) Inventors: Michael Neumann, Waiblingen (DE); Hardik Kothare, Burlingame, CA (US); William Burke, Portland, OR (US); Doug Habberstad, Savanna, GA (US); Jackson Liscombe, Mill River, MA (US); Oliver Roesler, Syke (DE); David Suendermann-Oeft, San Francisco, CA (US); David Pautler, Sarasota, FL (US); Andrew Cornish, Gore (NZ); Vikram Ramanarayanan, San Francisco, CA (US)

(73) Assignee: Modality.AI, Inc., San Francisco, CA (US)

( * ) Notice: Subject to any disclaimer, the term of this patent is extended or adjusted under 35 U.S.C. 154(b) by 317 days.

(21) Appl. No.: 18/383,259

(22) Filed: Oct. 24, 2023

(65) Prior Publication Data
US 2025/0127445 A1    Apr. 24, 2025

(51) Int. Cl.
*A61B 5/16* (2006.01)
*A61B 5/00* (2006.01)
(Continued)

(52) U.S. Cl.
CPC .......... *A61B 5/165* (2013.01); *A61B 5/4088* (2013.01); *A61B 5/4803* (2013.01);
(Continued)

(58) Field of Classification Search
None
See application file for complete search history.

(56) References Cited

U.S. PATENT DOCUMENTS

| 5,357,427 A | 10/1994 | Langen et al. |
| 9,311,932 B2 | 4/2016 | Carter |

(Continued)

FOREIGN PATENT DOCUMENTS

| WO | 2016154139 | 9/2016 |

OTHER PUBLICATIONS

Neumann et al., "On the Utility of Audiovisual Dialog Technologies and Signal Analytics for Real-time Remote Monitoring of Depression Biomarkers," Proceedings of the 1st Workshop on NLP for Medical Conversations, pp. 47-52, 2020, Assoc. for Computational Linguistics, https://doi.org/10.18653/v1/P17 (Year: 2020).*

(Continued)

Primary Examiner — Michelle M Koeth
(74) Attorney, Agent, or Firm — Fish IP Law, LLP; Tomas A. Prieto

(57) ABSTRACT

A system for remotely determining the potential presence of depression in a user. The system includes a virtual agent that administers one or more tasks to the user. The user performs the tasks and the performance is captured by a camera. The captured audiovisual data is sent to a server that derives objective metrics which are then applied to a classifying algorithm. If certain metrics meet certain thresholds, the system determines that the user is exhibiting depression symptoms. In embodiments, the system can further determine whether a user has been taking depression medication.

14 Claims, 8 Drawing Sheets

(51) Int. Cl.

| | | |
|---|---|---|
| *G06T 7/00* | (2017.01) | |
| *G06T 7/10* | (2017.01) | |
| *G06V 20/40* | (2022.01) | |
| *G06V 20/52* | (2022.01) | |
| *G06V 40/16* | (2022.01) | |
| *G06V 40/20* | (2022.01) | |
| *G10L 15/02* | (2006.01) | |
| *G10L 15/08* | (2006.01) | |
| *G10L 15/30* | (2013.01) | |
| *G10L 25/18* | (2013.01) | |
| *G10L 25/63* | (2013.01) | |
| *G16H 20/10* | (2018.01) | |
| *G16H 40/67* | (2018.01) | |

(52) U.S. Cl.
CPC .............. *G06T 7/0012* (2013.01); *G06T 7/10* (2017.01); *G06V 20/41* (2022.01); *G06V 20/49* (2022.01); *G06V 20/52* (2022.01); *G06V 40/171* (2022.01); *G06V 40/20* (2022.01); *G10L 15/02* (2013.01); *G10L 15/08* (2013.01); *G10L 15/30* (2013.01); *G10L 25/18* (2013.01); *G10L 25/63* (2013.01); *G16H 20/10* (2018.01); *G16H 40/67* (2018.01); *G06T 2207/10016* (2013.01); *G06T 2207/30004* (2013.01); *G06T 2207/30201* (2013.01); *G06V 2201/03* (2022.01)

(56) References Cited

U.S. PATENT DOCUMENTS

| | | | |
|---|---|---|---|
| 10,592,733 | B1 | 3/2020 | Ramanarayanan |
| 11,504,038 | B2 | 11/2022 | Howard |
| 2007/0033042 | A1 | 2/2007 | Marcheret et al. |
| 2012/0144336 | A1 | 6/2012 | Pinter et al. |
| 2013/0211832 | A1 | 8/2013 | Talwar et al. |
| 2014/0278386 | A1 | 9/2014 | Konchitsky |
| 2015/0051906 | A1 | 2/2015 | Dickens et al. |
| 2015/0058013 | A1 | 2/2015 | Pakhomov et al. |
| 2015/0126888 | A1 | 5/2015 | Patel |
| 2015/0356982 | A1 | 12/2015 | Chesney |
| 2018/0090127 | A1 | 3/2018 | Hofer et al. |
| 2018/0214061 | A1 | 8/2018 | Knoth et al. |
| 2018/0310866 | A1 | 11/2018 | Wrenn |
| 2019/0074028 | A1 | 3/2019 | Howard |
| 2019/0198043 | A1 | 6/2019 | Crespi et al. |
| 2019/0325898 | A1 | 10/2019 | O'Hart Kinney et al. |
| 2019/0348065 | A1 | 11/2019 | Talwar et al. |
| 2019/0378537 | A1 | 12/2019 | Li et al. |
| 2019/0385711 | A1 | 12/2019 | Shriberg et al. |
| 2020/0296513 | A1 | 9/2020 | Littrel et al. |
| 2020/0349938 | A1 | 11/2020 | Hwang et al. |
| 2020/0365275 | A1 | 11/2020 | Barnett et al. |
| 2021/0098110 | A1 | 4/2021 | Periyasamy et al. |
| 2021/0118329 | A1 | 4/2021 | Medan et al. |
| 2021/0121124 | A1 | 4/2021 | Shenhar et al. |
| 2021/0158834 | A1 | 5/2021 | Medan et al. |
| 2022/0148570 | A1 | 5/2022 | Weissberg et al. |
| 2022/0335939 | A1* | 10/2022 | Liscombe ............... G10L 25/78 |
| 2023/0018524 | A1 | 1/2023 | Ramanarayanan et al. |
| 2023/0386504 | A1 | 11/2023 | Lee et al. |

OTHER PUBLICATIONS

Cohen et al., "A multimodal dialog approach to mental state characterization in clinically depressed, anxious, and suicidal populations," Frontiers in Psychology, Sep. 11, 2023, https://doi.org/10.3389/fpsyg.2023.1135469 (Year: 2023).*

Robert et al., "Quantitative Voice Analysis in the Assessment of Bulbar Involvement in Amyotrophic Lateral Sclerosis," Acta Oto-Laryngologica, 2009, 119(6), 724-731. https://doi.org/10.1080/00016489950180702 (Year: 2009).*

Naumann, et al. "Investigating the Utility of Multimodal Conversational Technology and Audiovisual Analytic Measures for the Assessment and Monitoring of Amyotrophic Lateral Sclerosis at Scale," Interspeech, 2021. 5 pages.

Getz, Lindsey. "MMSE vs. MoCA: What You Should Know," Today's Geriatric Medicine. 2 pages.

Jia, et al. "A comparison of the Mini-Mental State Examination (MMSE) with the Montreal Cognitive Assessment (MoCA) for mild cognitive impairment screening in Chinese middle-aged and older population: a crosssectional study," BMC Psychiatry, 2021. 13 pages.

Roesler, et al. "Multimodal Dialog Based Remote Patient Monitoring of Motor Function in Parkinson's Disease and Other Movement Disorders," Modalitiy.AI and U of CA, San Francisco. 6 pages.

Arora, et al. "Detecting and monitoring the symptoms of Parkinson's disease using smartphones: a pilot study," 18 pages.

Kothare, et al. "Speech, Facial and Fine Motor Features for Conversation-Based Remote Assessment and Monitoring of Parkinson's Disease," 4 pages.

Goetz, et al. "MDS-UPDRS: The MDS-sponsored Revision of the Unified Parkinson's Disease Rating Scale," International Parkinson and Movement Disorder Society. 2018. 33 pages.

Boersma, et al. "Praat: doing phonetics by computer,".

Mundt, et al. "Voice acoustic measures of depression severity and treatment response collected via interactive voice response (IVR) technology," J Neurolinguistics. Jan. 2007 ; 20(1): 50-64. 17 pages.

Vasquez-Correa, et al. "Towards an automatic evaluation of the dysarthria level of patients with Parkinson's disease," Journal of Communicaiton Orders. 76 (2018) 21-36. 16 pages.

Yunusova, Y., Green, J.R., Wang, J., Pattee, G., Zinman, L. A Protocol for Comprehensive Assessment of Bulbar Dysfunction in Amyotrophic Lateral Sclerosis (ALS). J. Vis. Exp. (48), e2422, doi:10.3791/2422 (2011). 5 pages.

Rudzicz, Frank. "Acoustic transformations to improve the intelligibility of dysarthric speech," Proceedings of the 2nd Workshop on Speech and Language Processing for Assistive Technologies, pp. 11-21. 11 pages.

Cedarbaum, et al. "The ALSFRS-R: a revised ALS functional rating scale that incorporates assessments of respiratory function," J.M. Cedarbaum et al. / Journal of the Neurological Sciences 169 (1999) 13-21. 5 pages.

Bombaci, et al. "Telemedicine for management of patients with amyotrophic lateral sclerosis through COVID-19 tail," Neurological Sciences (2021) 42:9-13. 5 pages.

Morales, et al. "Modelling Errors in Automatic Speech Recognition for Dysarthric Speakers," EURASIP Journal on Advances in Signal Processing vol. 2009, Article ID 308340, 14 pages.

Norel, et al. "Detection of Amyotrophic Lateral Sclerosis (ALS) via Acoustic Analysis," 1Computational Biology Center, T.J. Watson IBM Research Laboratory, New York. 5 pages.

DeVault, et al. "SimSensei Kiosk: A Virtual Human Interviewer for Healthcare Decision Support," USC Institute for Creative Technologies, 12015 Waterfront Dr., Playa Vista, CA 90094, USA http://simsensei.ict.usc.edu/. 8 pages.

Victoria Young MHSc & Alex Mihailidis PhD (2010) Difficulties in Automatic Speech Recognition of Dysarthric Speakers and Implications for Speech-Based Applications Used by the Elderly: A Literature Review, Assistive Technology, 22:2, 99-112, DOI: 10.1080/10400435.2010.483646. 15 pages.

Kim, et al. "Dysarthric Speech Recognition Using Dysarthria-Severity-Dependent and Speaker-Adaptive Models," Department of Electrical Engineering Korea Advanced Institute of Science and Technology (KAIST), Daejeon, Republic of Korea. 6 pages.

Stegmann, et al. "Early detection and tracking of bulbar changes in ALS via frequent and remote speech analysis," npj Digital Medicine (2020) 3:132. 5 pages.

Borrie, et al. "Familiarisation conditions and the mechanisms that underlie improved recognition of dysarthric speech," Familiarisation conditions and the mechanisms that underlie improved recognition of dysarthric speech, Language and Cognitive Processes, 27:7-8, 1039-1055. 18 pages.

(56) References Cited

OTHER PUBLICATIONS

Lisetti, et al. "Now All Together: Overview of Virtual Health Assistants Emulating Face-to-Face Health Interview Experience." 11 pages.
Gomez, et al. "Articulation Acoustic Kinematics in ALS Speech." 7 pages.
Kumar, et al. "Mobile Health: Revolutionizing Healthcare Through Transdisciplinary Research." 8 pages.
Suendermann-Oeft, et al. "NEMSI: A Multimodal Dialog System for Screening of Neurological or Mental Conditions," ACM International Conference on Intelligent Virtual Agents (IVA '19), Jul. 2-5, 2019. 3 pages.
Green, et al. "Algorithmic Estimation of Pauses in Extended Speech Samples of Dysarthric and Typical Speech," J Med Speech Lang Pathol. Dec. 2004 ; 12(4): 149-154. 9 pages.
Byers, et al. "2017 Pilot Open Speech Analytic Technologies Evaluation," NISTIR. 27 pages.
Yunusova, et al. "Profiling Speech and Pausing in Amyotrophic Lateral Sclerosis (ALS) and Frontotemporal Dementia (FTD)," PLoS ONE 11(1): e0147573. doi:10.1371/journal.pone.0147573. 18 pages.
Robert, et al. "Quantitative Voice Analysis in the Assessment of Bulbar Involvement in Amyotrophic Lateral Sclerosis," Acta Oto-Laryngologica, 119:6, 724-731, DOI: 10.1080/00016489950180702. 9 pages.
Kodrasi, et al. "Spectro-Temporal Sparsity Characterization for Dysarthric Speech Detection," IEEE/ACM Transactions on Audio, Speech, and Language Processing, vol. 28, 2020. 13 pages.
Janbakhshi, et al. "Subspace-Based Learning for Automatic Dysarthric Speech Detection," IEEE Signal Processing Letters, vol. 28, 2021. 5 pages.
Kent, et al. "Toward an acoustic typology of motor speech disorders," Clinical Linguistics & Phonetics, 17:6, 427-445, DOI: 10.1080/0269920031000086248. 20 pages.
Lee, et al. "Vowel-Specific Intelligibility and Acoustic Patterns in Individuals With Dysarthria Secondary to Amyotrophic Lateral Sclerosis," Journal of Speech, Language, and 34 Hearing Research • vol. 62 • 34-59 • Jan. 2019. 27 pages.
Neumann, et al. "On the Utility of Audiovisual Dialog Technologies and Signal Analytics for Real-time Remote Monitoring of Depression Biomarkers," Modality.ai, Inc., 6 pages.
Ivascu, et al. "A Multi-agent Architecture for Ontology-based Diagnosis of Mental Disorders," 17th International Symposium on Symbolic and Numeric Algorithms for Scientific Computers, IEEE Xplore, 8 pages.

\* cited by examiner

| Domain | | Metrics |
|---|---|---|
| Audio | Energy | shimmer (%), intensity (dB), signal-to-noise ratio (dB) |
| | Timing | speaking and articulation duration (sec.), articulation and speaking rate (WPM), percent pause time (PPT, %), canonical timing agreement (CTA, %) |
| | Voice quality | cepstral peak prominence (CPP, dB), harmonics-to-noise ratio (HNR, dB) |
| | Frequency | mean, max., min. fundamental frequency F0 (Hz), first three formants F1, F2, F3 (Hz), slope of 2nd formant (Hz/sec.), jitter (%) |
| Video | Mouth (distances) | lip aperture/opening, lip width, mouth surface area, mean symmetry ratio between left and right half of the mouth |
| | Movement | velocity, acceleration, jerk, and speed of lower lip and jaw center |
| | Eyes | number of eye blinks per sec., eye opening, vertical displacement of eyebrows |
| Text | Lexico-semantic | word count, percentage of content words, noun rate, verb rate, pronoun rate, noun-to-verb ratio, noun-to-pronoun ratio, closed class word ratio, idea density |
| | Cognitive scores | percentage of correct words (immediate and delayed word recall), digit span forward/backward score (ranges from 0 to 2) |

FIG. 6

MULTIMODAL INVESTIGATION OF SPEECH, TEXT, COGNITIVE AND FACIAL VIDEO FEATURES FOR CHARACTERIZING DEPRESSION WITH AND WITHOUT MEDICATION

FIELD OF THE INVENTION

The field of the invention is depression detection technologies.

BACKGROUND

The background description includes information that may be useful in understanding the present invention. It is not an admission that any of the information provided herein is prior art or relevant to the presently claimed invention, or that any publication specifically or implicitly referenced is prior art.

Clinical depression is a leading cause of disability worldwide. In 2020, an estimated 8.4% of U.S. adults had at least one episode of major depression, and the prevalence of depression symptoms increased notably during the COVID-19 pandemic. Diagnosis, detection and monitoring of mental and neurological conditions, including major depressive disorder (MDD), remain a critical need today. This necessitates the development and validation of scalable, multimodal, and cost-effective technology for automatic assessment of individuals' health and well-being in the user's natural information technology environment.

Because depression affects speech features, facial activity and expressiveness, these signals have the potential to serve as objective markers that can be analyzed automatically by means of speech processing and computer vision. While earlier efforts for remote patient monitoring (RPM) usually required the use of dedicated hardware, recent work in the field focuses on using available consumer devices such as smartphones and wearables for various types of monitoring.

However, even with this prior work, there is still a need for systems that offer greater speed and accuracy in evaluating a patient's inputs and determining whether a depression condition could exist.

Thus, there is still a need for a system that facilitates a detection of possible presence of depression that can be remotely administered.

SUMMARY OF THE INVENTION

The inventive subject matter provides apparatus, systems and methods in which a user can be tested for the possible presence of depression or symptoms of depression as well as the use of medications for depression.

The inventive subject matter includes a user's computing device through which a virtual agent presents one or more tasks for the user to perform. Using a camera and a microphone integral to or connected with the user's computing device, the user's performance is captured and audiovisual data of the performance is produced. The audiovisual data is then provided to at least one remote computing device. The audiovisual data can be streamed or otherwise transmitted to the remote computing device over a network such as the internet.

Upon receiving the audiovisual data, the remote computing device segments the data and calculates objective metrics for the use based on the segmented audiovisual data.

The remote computing device then applies a classifying algorithm to the objective metrics, through which the remote computing device can determine whether the user may have depression based on the output of the classifying algorithm.

In embodiments of the inventive subject matter, the objective metrics are derived according to one or more of a speech acoustic domain, a facial domain, a linguistic domain, a cognitive domain a motor domain, and an emotional domain.

In embodiments of the inventive subject matter, the tasks presented via the virtual agent for the user to perform can include one or more of a counting task, a reading task (e.g., reading sentences, reading consonant-vowel-consonant words, etc.), an oral diadochokinesis task, a picture description task, a spontaneous speech task, a forward-and-backward digit span task, a word recall task, a semantic fluency task or a sequential command task.

In embodiments of the inventive subject matter, the remote computing device refines the objective metrics by first removing any objective metric values beyond a predefined number of standard deviations (e.g., five standard deviations) and then, for the remaining objective metrics, recalculating a mean and a standard deviation and removing any remaining objective metric values beyond a second number of standard deviations (e.g., three standard deviations).

The remote computing device then applies a classifying algorithm to the objective metrics to determine whether a user is exhibiting symptoms of depression. These results can be returned to the user's computing device and/or sent to a healthcare provider, sponsor, clinician, or other caregiver or involved party.

In embodiments of the inventive subject matter, the remote computing device further determines whether a user is likely taking antidepressant medications.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

BRIEF DESCRIPTION OF THE DRAWING

FIG. 6 shows a table with some example metrics that can be derived by the server.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
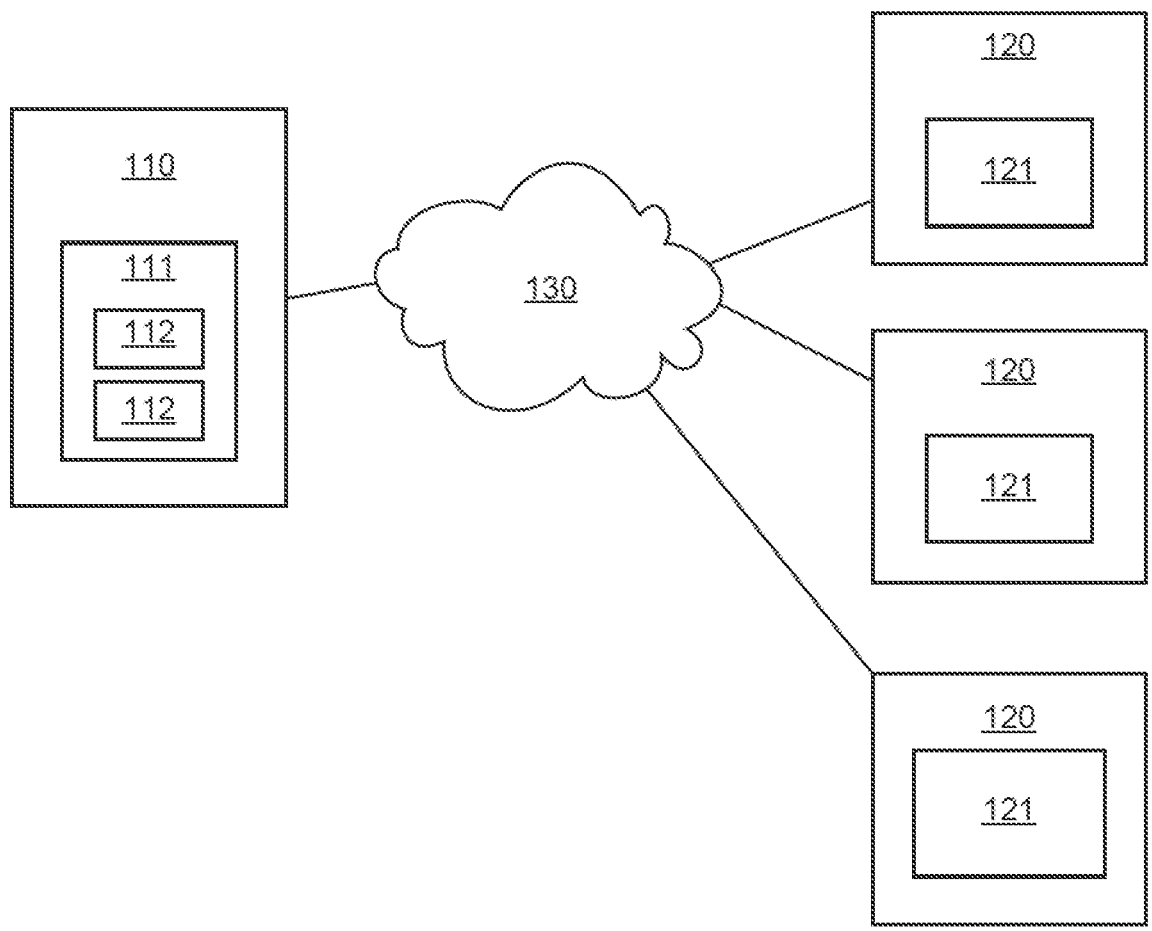
FIG. 1 is a diagrammatic overview of a system according embodiments of the inventive subject matter.

FIG. 1 is an illustrative diagram of the various components of system 100, according to embodiments of the inventive subject matter.

The system 100 includes a remote computing device 110 (otherwise referred to server 110) that can communicate to one or more client devices 120 over a network 130 (e.g., the internet). The server 110 can be one or more computing devices that include at least one processor, storage, and communication interface(s), located in one or more locations that can store and communicate data with other components of the system 100. The server 110 can include a database 111 that stores a plurality of performance tests or tasks 112.

The tasks 112 include computer executable instructions that enable the system 100 to administer a task to a user, obtain performance information captured via one or more sensors (e.g., a camera, microphone, etc.), and then enable the server 110 to analyze the performance of the test and determine whether a condition may exist.

For the example task 112 above, the database 111 stores the executable instructions that enables the presentation of instructions via the virtual agent 121 (which could be a video of someone performing the test), the capturing of the patient performing the test (such as via a video camera on the computing device 120), the analysis of the task to determine a condition (in this case, level of impairment) and the transmission of the test to appropriate parties (the patient themselves, health care providers, etc.).

The data and instructions associated with a task 112 can include one or more metrics that are associated with the task 112 that can give an indication of the potential presence of depression or depression symptoms and the severity. The metrics can be thought of as the measurable characteristics associated with the user's performance of the task that have been observed to be related or correlated with depression. The metrics thus could be considered attributes, whose values can be measured by the system when the user performs a task. The data and instructions of task 112 can also include one or more thresholds of values, beyond which (above or below, depending on the metric) the metric can be considered to be indicative of the presence of depression (alone or in combination with other metrics).

Examples of tasks 112 can include one or more of a counting task, a reading task (e.g., reading sentences, reading consonant-vowel-consonant words, etc.), an oral diadochokinesis task, a picture description task, a spontaneous speech task, a forward-and-backward digit span task, a word recall task, a semantic fluency task, a motor task, an emotion elicitation task, or a sequential command task.

The client computing devices 120 can access the functions of the inventive subject matter via multiple ways. For example, a downloadable application or via a web portal accessible over a browser. The client computing devices 120 include at least one processor, at least one non-transitory computer-readable storage medium, and I/O interfaces that allow a user to receive data from and interact with the computing device 120 (e.g., monitor, touch screen, speakers, mouse, keyboard, cameras, etc.). The client computing devices 120 also have communication interfaces (e.g., Wi-Fi, wired internet connection, cellular, etc.) that enable the device 120 to exchange data over network 130. Examples of suitable computing devices 120 can include desktop computers, laptop computers, tablets, smartphones, and video game consoles.

To administer the tasks 112 and enable other interactions with a patient, a client computing device 120 executes a virtual agent 121. The virtual agent 121 can be installed on the client computing device 120. In other embodiments, the virtual agent 121 is executed by the server 110 and merely presented on the client computing device 120 via a web browser or other user-facing portal.

Figure 2:
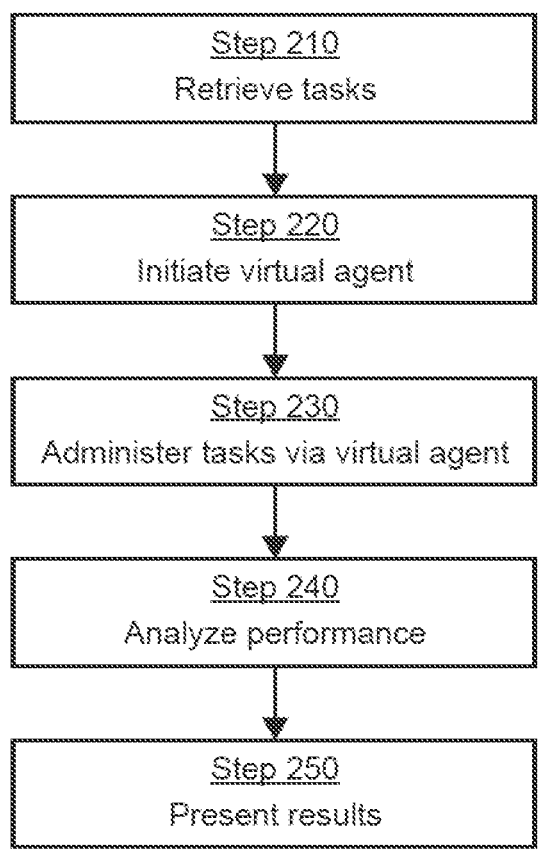
FIG. 2 is a flowchart illustrating the overall process executed by the system, according to embodiments of the inventive subject matter.

FIG. 2 is a flowchart of a process according to embodiments of the inventive subject matter.

At step 210, the server 110 retrieves one or more tasks that are to be presented to the user for performance. The retrieval of the tasks, including the selection of one or more of the tasks, can be based on a previous recommendation or instruction, such as by the user's physician or other medical professional.

At step 220, the computing device 120 initiates the virtual agent 121. The initiation of the virtual agent 121 can be in response to the server 110 identifying that one or more performance tests need to be administered to this specific user. The virtual agent 121 can, in embodiments, be initialized based on a user logging on to their account and accessing a test.

At step 230, the server 110 executes the task such that it is administered via the virtual agent 121 on computing device 120.

Figure 3:
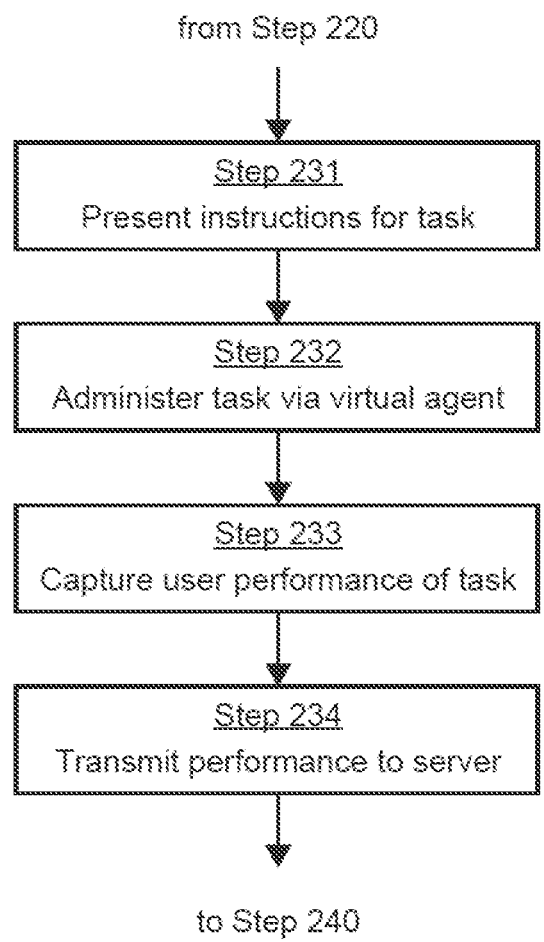
FIG. 3 is a flowchart illustrating the process of administrating the task in greater detail.

The detailed steps of the administration of the task can be seen in FIG. 3.

Via the virtual agent 121, the administration of the task can include presenting instructions for the task at step 231. This can include visual and/or audio instructions presented via the virtual agent 121 that explains the task to the user. The visual components of the instructions can include text, still images and/or video images.

For example, the instructions for a task involving reading sentences or certain words can include a video that shows the virtual agent 121 presenting the text and then a person reading the text back. The instructions can also include a prompt to begin the task.

The instructions can also include directions to the user regarding camera placement, framing of the camera and proper positioning relative to the camera.

At step 232, the server 110 administers the task via the virtual agent 121. The administration of the task via the virtual agent 121 can vary depending on the task itself.

To begin the administration of the task, the virtual agent 121 can ask the user to click on a "ready" button or speak a word indicating they are ready. In embodiments, the virtual agent 121 can have a countdown or other indication that the task will begin shortly after the instructions of step 231 so that the user does not have to interact with the system at all to transition into the task.

At step 233, the computing device 120 captures the user's performance of the task 112 via one or more sensors 122 integral or connected to the computing device 120. In preferred embodiments, the sensors 122 include a camera and a microphone (which can be integral to or separate from the camera). Other peripherals used by the user to perform the task can include a touchscreen, a keyboard or mouse, etc.

The sensor data captured by the sensor 122 during the performance of the task can be transmitted to the server 110 by the computing device 120 at step 234. In preferred embodiments, the sensor data is audiovisual data. The sensor data can be streamed to the server 110 or otherwise transmitted to the server 110 (such as by first saving on the computing device 120 and then transmitting it to the server 110). The process then moves on to step 240.

At step 240, the server 110 analyzes the performance of the task based on the sensor data captured by sensor 122.

Figure 4:
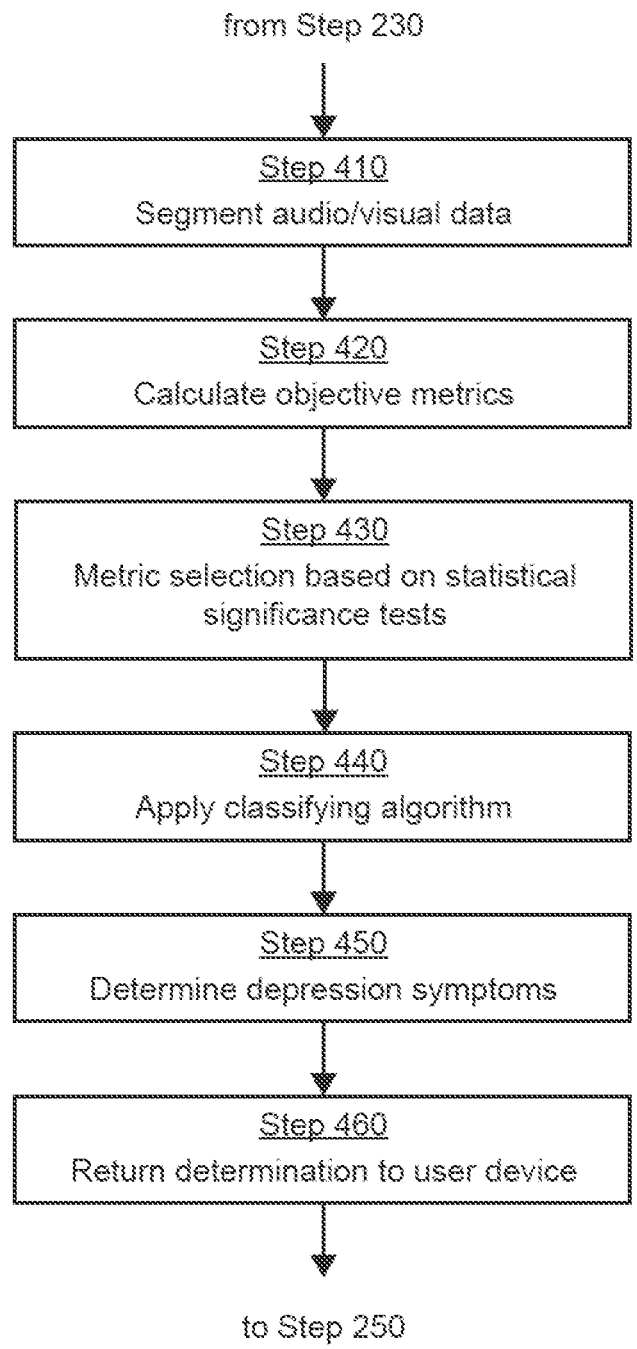
FIG. 4 is a flowchart illustrating the process of analysis in detail.

The analysis of step 240 is shown in detail in the flowchart of FIG. 4.

At step 410, the server 110 segments the audiovisual data. In embodiments of the inventive subject matter, segmenting the audiovisual data can include the server 110 segmenting the audiovisual data into individual utterances (e.g., words, sentences, phrases or a section of speech) and/or video captures of the user. The segmenting can be performed at various levels of granularity. For example, the segmentation can a segmentation of the audio/video stream into "dialog turns" (i.e., segmenting into the prompts of the virtual agent and then the responses of the participant). The response segments can then be segmented into individual utterances (e.g., words, sentences, phrases or sections of speech).

At step 420, the server 110 uses the segmented audiovisual data to calculate objective metrics for the user based on the user's performance of the task. The objective metrics calculated by the server 110 can include metrics in the following domains: a speech acoustic domain, a facial domain, a linguistic domain, a cognitive domain, a motor domain, and an emotional domain. The methods employed by the server 110 to derive the objective metrics can depend on the particular domain for which the objective metrics are being calculated. The speech acoustic domain can include metrics derived from an analysis of the audio signal itself. The facial domain can include metrics derived from analysis of facial landmarks (i.e., points of interest on the face) in the video signal. The linguistic domain can include metrics derived from analysis of the spoken words themselves, based on speech-to-text technologies and then applying natural language processing ("NLP") methods to the textual transcriptions. The cognitive domain can include metrics representative of results of analysis of cognitive and memory abilities. The metrics for the cognitive domain can often stem from or be derived from metrics associated with the other modalities. The Motor domain refers to measurements of properties of movements of different body parts, e.g., limbs, fingers, hands (e.g., in fingertapping tasks), orofacial movement (like movement of lips and raising of eyebrows), etc., and the metrics are representative of these movements. The emotional domain refers to affective features that capture various emotions—examples are smiles or frowns on the face, or raised or lowered pitch for voice. The objective metrics for the emotional domain are those that are reflective of the affective features as captured from the user. The underlying tasks that result in the metrics used for the cognitive domain metrics are specific to cognitive testing.

To extract metrics in the speech acoustic domain, the server 110 applies known acoustic and vocal recognition techniques. To extract metrics in the visual/facial domain, the server 110 can apply known image recognition techniques. For metrics in the facial domain, the server 110 derives the metrics based on facial landmarks that are extracted using known face detectors and facial landmark detectors.

The server 110 derives linguistic metrics using known linguistic and/or transcription software services, which includes software that computes lexico-semantic features for the spontaneous speech parts of the conversation.

For the cognitive score associated with cognitive tasks (such as word and digit recall), the server 110 first applies voice recognition and/or linguistic/transcription software services to recognize the spoken words. The server 110 then applies a scoring based on this recognition. For example, for word recall tasks, a score can be a percentage of correct words. For digit span tasks, the server 110 can score the task based on whether the digits were repeated in the same order (for example, a score of "2"), whether all digits were present, but not in the correct order (a score of "1") or that not all digits were recited (a score of "0").

For visual metrics, the server 110 can measure pixel distance to account for a distance of movement of relevant features (jaw, lips, etc., depending on the task and/or metric).

FIG. 6 shows a table with some example metrics that can be derived by the server 110. In the table of FIG. 6, the metrics are divided into categories/modalities of audio, video and text. Within these are examples of domains having in each modality and the corresponding metrics that are observable/derivable within the domains for each modality.

In embodiments of the inventive subject matter, the server 110 can merge demographic information about the user with the objective metrics at step 420. The demographic information can include information such as age, country of birth, employment status, ethnicity, first language, gender, relationship/marital status, sex, student status, etc.

Figure 5:
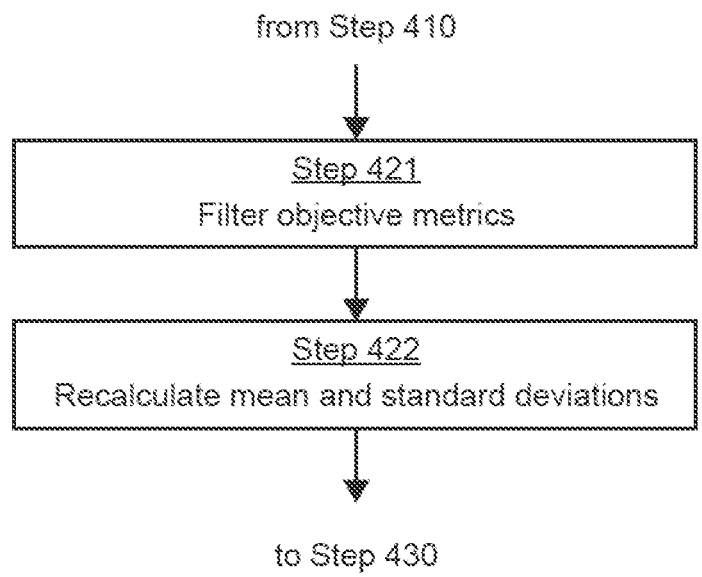
FIG. 5 is a flowchart illustrating the process of refining the objective metrics.

In embodiments of the inventive subject matter, the server 110 can refine the objective metrics after they are calculated. The process of refining the objective metrics is seen on FIG. 5, and is as follows:

At step 421, the server 110 first removes any objective metrics values beyond a predefined number of standard deviations. For example, in this process, the predefined number of standard deviations is five standard deviations though other numbers of standard deviations are contemplated.

At step 422, the server 100 recalculates a mean and a standard deviation for the remaining objective metrics from step 421, and then removes any remaining objective metrics having values beyond a second predefined number of standard deviations. For this example, the second predefined number of standard deviations is three standard deviations. Other numbers of standard deviations are also contemplated.

Statistical tests to identify significantly different metrics between two or more cohorts can be used to pre-select metrics for the classification tasks later on. In machine learning, this is called 'feature selection'. The server 110 does not take all metrics as input to the classification, but only those that showed significant differences in the statistical tests.

Using statistical tests, the server 110 identifies metrics that are statistically significantly different in the following cohort pairs at step 430. One example of a suitable statistical test is the Kruskal-Wallis (analysis of variance) test. Other statistical tests for feature selection are known in the art and that can be applied here as well. The cohort pairs of step 430 are as follows:

1) People with no or minimal depression symptoms compared to people with at least mild depression symptoms. For this cohort pair, the relevant identified metrics can include: pronoun rate, digit span forward score, digit span backward score, immediate recall score, noun-pronoun ratio, noun-verb ratio, noun rate, percentage content words, articulation duration, maximum lower lip speed, maximum jaw center acceleration, maximum lower lip acceleration, average lower lip speed, maximum jaw center speed, average lower lip acceleration, average jaw center speed, average jaw center acceleration, etc.

2) People with no or minimal depression symptoms compared to people with at least moderate depression symptoms. For this cohort pair, the relevant identified metrics can include: number of syllables (DDK), articulation rate, digit span forward score, digit span backward score, noun-verb ratio, noun rate, percentage content words, articulation duration, maximum lower lip speed, maximum jaw center acceleration, maximum lower lip acceleration, average lower lip speed, maximum jaw center speed, average lower lip acceleration, average jaw center speed, average jaw center acceleration, etc.

3) People with no or minimal depression symptoms compared to people with at least moderately severe depression symptoms. For this cohort pair, identified metrics can include: articulation rate, digit span backward score, speaking duration, articulation duration, maximum jaw center acceleration, maximum lower lip acceleration, average lower lip speed, average lower lip acceleration, average jaw center speed, average jaw center acceleration, etc.

4) People with depression symptoms who take antidepressants compared to people with depression symptoms who do not take any medication. For this cohort pair, identified metrics can include: digit span forward score, articulation duration, maximum lower lip speed, maximum lower lip acceleration, harmonics-to-noise ratio, articulation rate, etc. For this cohort pair, the process of determining whether a person who exhibits depression symptoms and is on medication is discussed in greater detail below.

At step 440, the server 110 applies a classifying algorithm to the objective metrics.

Figure 7:
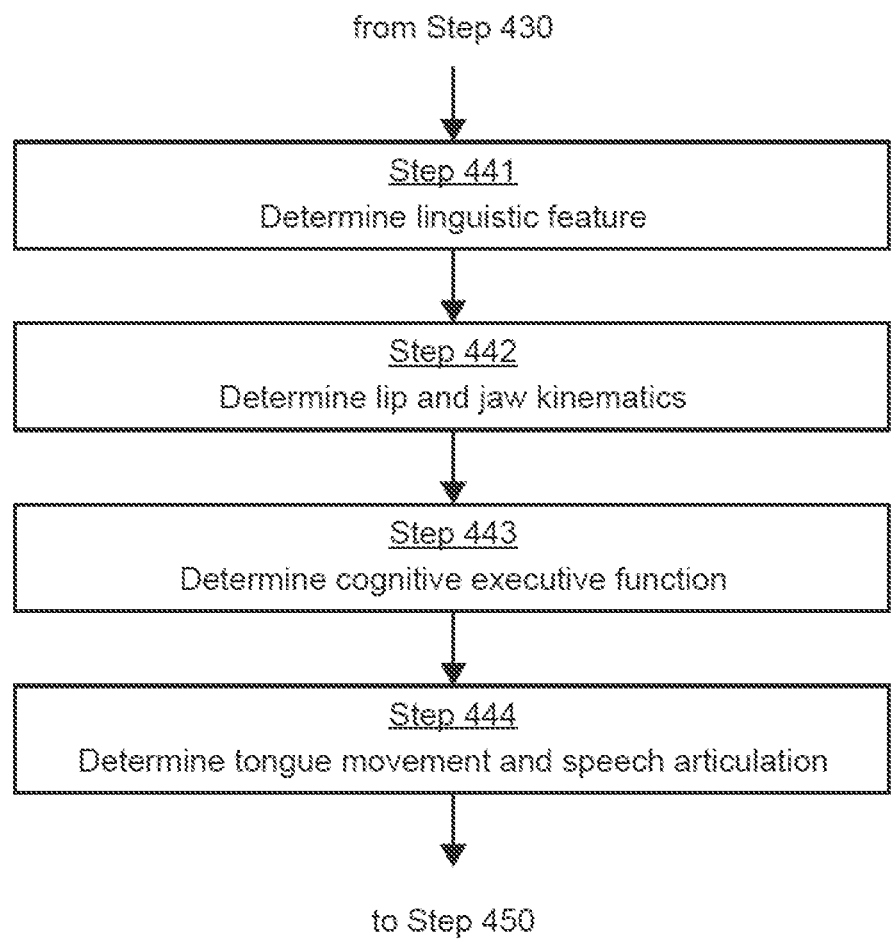
FIG. 7 is a flowchart illustrating the execution of the classifying algorithm.

In embodiments of the inventive subject matter, the classifying algorithm is executed is illustrated on FIG. 7 as follows:

At step 441, the server 110 determines whether a metric representative of linguistic feature of noun usage is less than a corresponding threshold value. Metrics representative of linguistic features of noun usage can include noun-to-verb ratios.

At step 442, the server 110 determines whether a metric representative of lip and jaw kinematics is less than a corresponding threshold value. Metrics representative of lip and jaw kinematics can include one or more of an average speed of the jaw center and a maximum speed of the lower lip. An example of a suitable threshold value for the average speed of the jaw center can be 0.03 1/frame.

Distances based on facial landmarks are normalized in the system by dividing them by the distance between the eyes. This is done to account for variable distance from the user to the camera. It results in a unitless measurement (because it was divided pixels by pixels).

Then, when the velocity of a landmark is calculated, the denominator is not seconds, but frames because the system measures the traveled distance divided by video frames. As a result, the unit for velocity in this case is expressed as 1/frame. However, this can be converted to mm/second or other convenient conventional unit of measurement.

At step 443, the server 110 determines whether a metric representative of cognitive executive function, attention or memory is greater than a corresponding threshold value. Metrics representative of cognitive executive function, attention or memory can include a digit span forward score. The digit span forward is a task of a cognitive test wherein participants are asked to repeat digits in the same order in which they heard them. The digit span forward score is a scoring of the performance of the task by a user. In one example, the digit span forward score can comprise a number of digits recalled correctly divided by the total number of digits presented.

At step 444, the server 110 determines whether a metric representative of tongue movement and speech articulation is greater than a corresponding threshold value. Metrics representative of tongue movement and speech articulation can include an articulation rate in words per minute.

At step 450, the server 110 determines whether the user has depression or depression symptoms based on the output of the classifying algorithm. If all of the threshold values at steps 441-444 are met, the server 110 then determiners that the user exhibits depression symptoms.

At step 460, the server 110 can return the determination and other information to the user computing device 120, which can then present the determination to the user at step 250.

In embodiments of the inventive subject matter, the server 110 can transmit the determination and other information to the computing device(s) of one or more healthcare providers at step 250.

It is contemplated that other algorithms can be applied to the objective metrics to determine whether a user likely has depression or is exhibiting depression symptoms. For example, deep neural networks can be applicable.

Figure 8:
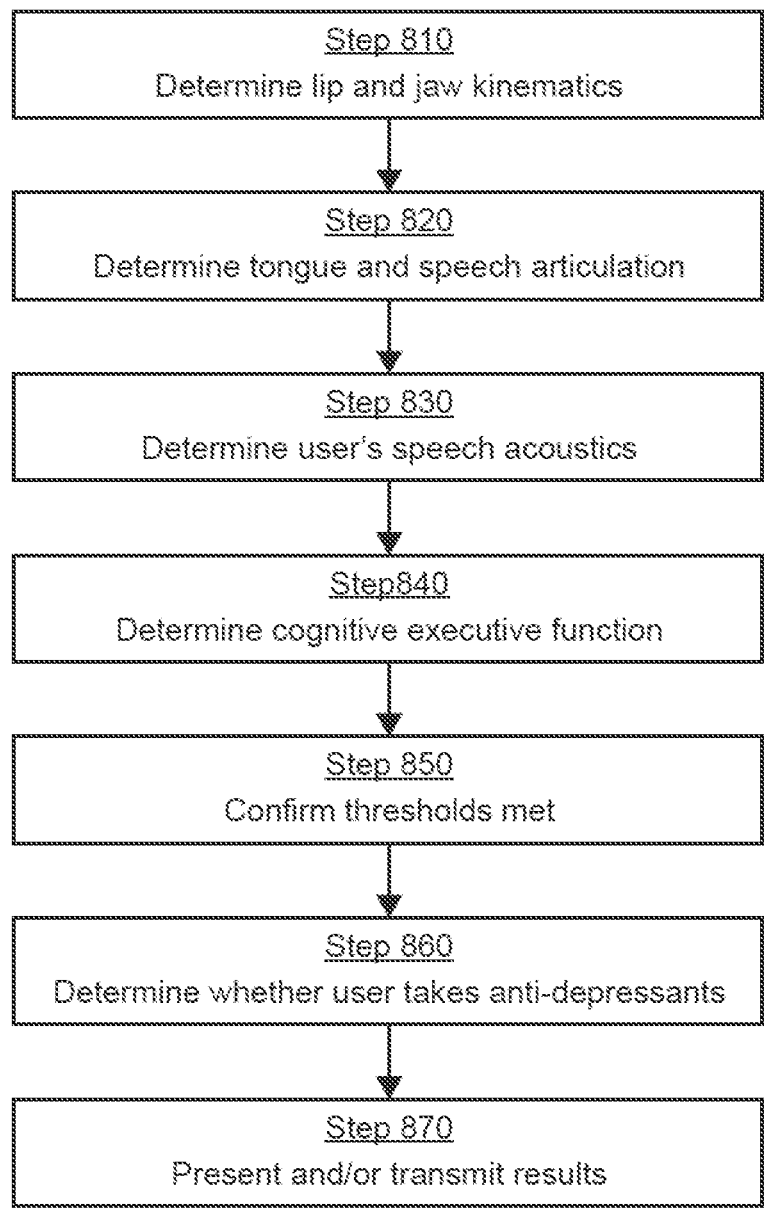
FIG. 8 is a flowchart illustrating the process of determining whether a user is taking antidepressants in detail.

In embodiments of the inventive subject matter, the server 110 can also determine whether a user is likely to be taking anti-depressants. This process can happen after steps 450 or 460. FIG. 8 is a flowchart of this process. An example of a suitable threshold for articulation rate is 205 words per minute. An example of a threshold for maximum lower lip speed is 0.14 1/frame. An example of a threshold for harmonics-to-noise ratio (HNR) is 12 decibels.

These example thresholds and other examples provided are for illustration of suitable threshold values, but other values can be used. The actual values that a classifier determines can deviate and depend on the particular dataset and other factors such as depression severity, possibly the type of medication, and more.

At step 810, the server 110 determines whether a metric representative of lip and jaw kinematics is greater than a corresponding threshold. This threshold can be different from the threshold of step 442. The representative feature of lip and jaw kinematics used for step 810 can be the same or different than that used at step 442.

At step 820, the server 110 determines whether a metric representative of the tongue movement and speech articulation is less than a corresponding threshold. The threshold at step 820 can be different than the threshold of step 444. The representative feature of tongue movement and speech articulation use for step 820 can be the same or different than that used at step 444.

At step 830, the server 110 determines whether one or more metrics representative of the user's speech acoustics and spectral information is less than a corresponding threshold. Metrics representative of a user's speech acoustics and spectral information can include a harmonics-to-noise ratio.

At step 840, the server 110 determines whether a metric representative of cognitive executive function, attention or memory is greater than a corresponding threshold. The threshold at step 840 can be different than the threshold of step 443. The representative feature of tongue movement and speech articulation use for step 840 can be the same or different than that used at step 443.

At step 850, the server 110 confirms whether all of the thresholds at steps 810-840 have been met. If so, the server 110 determines that the user is likely taking anti-depressant medication at step 860. This result can then be transmitted to the computing device 120 for presentation to the user, and can, in embodiments, also/alternatively be transmitted to one or more computing device(s) of healthcare provider(s) at step 870.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for detecting a possible presence of depression, comprising:

presenting, by a computing device and via a virtual agent, at least one task for a user to perform;

capturing, by the computing device, audiovisual data of a performance of the at least one task by the user;

streaming, by the computing device, the audiovisual data to at least one remote computing device;

segmenting, by the remote computing device, the audio-visual data;

calculating, by the remote computing device, objective metrics for the user;

applying, by the remote computing device, a classifying algorithm to the objective metrics, the classifying algorithm comprising:
- (a) determining, by the remote computing device, whether a metric representative of a linguistic feature of noun usage is less than a first threshold value;
- (b) determining, by the remote computing device, whether a metric representative of lip and jaw kinematics is less than a second threshold;
- (c) determining, by the remote computing device, whether a metric representative of cognitive executive function, attention or memory is greater than a third threshold;
- (d) determining, by the remote computing device, whether a metric representative of tongue movement and speech articulation is greater than a fourth threshold;
- determining, by the remote computing device, that all of the first threshold, the second threshold, the third threshold and the fourth threshold have been met; and
- in response to determining that all of the first threshold, the second threshold, the third threshold and the fourth threshold have been met, determining, by the remote computing device, that the user exhibits depression symptoms; and determining, by the remote computing device, whether the user may have depression based on an output of the classifying algorithm.

2. The method of claim 1, wherein the objective metrics are derived according to one or more of a speech acoustic domain, a facial domain, a linguistic domain, a motor domain, an emotional domain, and a cognitive domain.

3. The method of claim 1, wherein the at least one task comprises at least one of a counting task, a consonant-vowel-consonant reading task, an oral diadochokinesis task, a reading task, a picture description task, a reading sentences task, a spontaneous speech task, a forward-and-backward digit span task, a motor task, an emotion elicitation task, a word recall task, a semantic fluency task and a sequential command task.

4. The method of claim 1 further comprising, after the step of calculating: merging, by the remote computing device, demographics information with the calculated objective metrics.

5. The method of claim 1, further comprising refining the objective metrics following the step of calculating, wherein the step of refining the objective metrics comprises:
- removing, by the remote computing device, any objective metrics beyond a first predefined number of standard deviations; and
- for remaining objective metrics, recalculating, by the remote computing device, a mean and a standard deviation and removing any remaining objective metrics with values beyond a second predefined number of standard deviations.

6. The method of claim 5, wherein the first predefined number of standard deviations comprises five standard deviations and the second predefined number of standard deviations comprises three standard deviations.

7. The method of claim 1, wherein the metric representative of linguistic feature comprises a noun-to-verb ratio.

8. The method of claim 1, wherein the metric representative of lip and jaw kinematics comprises at least one of an average speed of the jaw center and a maximum speed of the lower lip.

9. The method of claim 1, wherein the metric representative of cognitive executive function, attention or memory comprises a digit span forward score.

10. The method of claim 1, wherein the metric representative of tongue movement and speech articulation comprises an articulation rate in words per minute.

11. The method of claim 1, further comprising:
- providing, by the remote computing device, the determination that the user exhibits depression symptoms to the computing device; and
- presenting, by the computing device, the output to the user.

12. The method of claim 1, further comprising providing, by the remote computing device, the determination that the user exhibits depression symptoms to a healthcare provider.

13. The method of claim 1, further comprising determining whether the user is likely taking anti-depressant medication, where determining whether the user is likely taking anti-depressant medication further comprises:
- (e) determining, by the remote computing device, whether the metric representative of lip and jaw kinematics is greater than a fifth threshold;
- (f) determining, by the remote computing device, whether the metric representative of tongue movement and speech articulation is less than a sixth threshold;
- (g) determining, by the remote computing device, whether a metric representative of the user's speech acoustics and spectral information is less than a seventh threshold;
- (h) determining, by the remote computing device, whether the metric representative of cognitive executive function, attention or memory is greater than an eighth threshold;
- determining, by the remote computing device, that all of the fifth threshold, the sixth threshold, the seventh threshold and the eighth threshold have been met; and
- determining, by the remote computing device, that the user is likely taking anti-depressant medication in response to determining that all of the fifth threshold, the sixth threshold, the seventh threshold and the eighth threshold have been met.

14. The method of claim 13, wherein the metric representative of the user's speech acoustics and spectral information comprises a harmonics-to-noise ratio.

* * * * *